(12) United States Patent
Qiu et al.

(10) Patent No.: US 8,605,779 B2
(45) Date of Patent: Dec. 10, 2013

(54) MECHANISMS TO CONCEAL REAL TIME VIDEO ARTIFACTS CAUSED BY FRAME LOSS

(75) Inventors: Jingyu Qiu, Issaquah, WA (US); Timothy M. Moore, Bellevue, WA (US); Zong Zong Yuan, Bellevue, WA (US); Regis J. Crinon, Camas, WA (US)

(73) Assignee: Microsoft Corporation, Redmond, WA (US)

( * ) Notice: Subject to any disclaimer, the term of this patent is extended or adjusted under 35 U.S.C. 154(b) by 1564 days.

(21) Appl. No.: 11/765,836

(22) Filed: Jun. 20, 2007

(65) Prior Publication Data
US 2008/0316362 A1 Dec. 25, 2008

(51) Int. Cl.
*H04N 7/12* (2006.01)
*H04N 11/02* (2006.01)
*H04N 11/04* (2006.01)

(52) U.S. Cl.
USPC ............ 375/240.01; 375/240.12; 375/240.27; 375/240.28

(58) Field of Classification Search
USPC .................. 375/240, 240.01, 240.12, 240.27, 375/240.28
See application file for complete search history.

(56) References Cited

U.S. PATENT DOCUMENTS

| | | | |
|---|---|---|---|
| 4,989,088 A | 1/1991 | Wada | |
| 5,528,284 A | 6/1996 | Iwami et al. | |
| 6,049,570 A | 4/2000 | Fukunaga | |
| 6,195,393 B1 | 2/2001 | Nemiroff | |
| 6,381,282 B1 | 4/2002 | Kwan | |
| 6,421,387 B1 | 7/2002 | Rhee | |
| 7,650,031 B2 * | 1/2010 | Liu et al. .................... | 382/165 |
| 2003/0039312 A1 | 2/2003 | Horowitz | |
| 2004/0141557 A1 | 7/2004 | Lin | |
| 2005/0105889 A1 | 5/2005 | Conklin | |
| 2005/0157799 A1 | 7/2005 | Raman | |
| 2005/0254584 A1* | 11/2005 | Kim et al. ............... | 375/240.27 |
| 2006/0062312 A1 | 3/2006 | Lee | |
| 2008/0141091 A1* | 6/2008 | Kalluri ....................... | 714/748 |
| 2009/0074078 A1 | 3/2009 | Yamamoto et al. | |

FOREIGN PATENT DOCUMENTS

| | | |
|---|---|---|
| EP | 1739974 | 1/2007 |
| KR | 1020030080136 A | 11/2003 |
| KR | 1020050089457 A | 9/2005 |
| KR | 1020060023686 A | 3/2006 |
| WO | WO 2006075302 | 7/2006 |
| WO | WO 2006112139 | 10/2006 |
| WO | 2007018709 A2 | 2/2007 |

OTHER PUBLICATIONS

Chinese OA dated Mar. 23, 2011 for Chinese Patent Application No. 200880021270.3, 8 pages.

(Continued)

*Primary Examiner* — Edan Orgad
*Assistant Examiner* — Jahangir Kabir

(57) ABSTRACT

The claimed subject matter provides systems and/or methods that facilitate describing, communicating, utilizing, etc. a frame dependency structure in connection with real time video communication. For example, a protocol can be employed to communicate the dependency structure from a sender to a receiver. Moreover, a mechanism on a receiver side can detect frame(s) that will be rendered with artifacts if displayed due to previous frame loss; this mechanism can leverage receiver side knowledge concerning the dependency structure of the frames.

23 Claims, 11 Drawing Sheets

(56) References Cited

OTHER PUBLICATIONS

International Search Report and Written Opinion for PCT Application No. PCT/US2008/064805, mailed Dec. 3, 2008, 9 pages.

Ajit S. Bopardikar, et al. Temporal concealment of packet-loss related distortions in video based on Structural Alignment. http://www.q2s.ntnu.no/publications/open/2005/Paper_rev/2005_bopardikar_TCP.pdf. Last accessed Mar. 16, 2007.

H.264 Based Video Conferencing Solution. 2002, UB Video Inc. http://focus.ti.com/lit/ml/spry084/spry084.pdf. Last accessed Mar. 16, 2007.

Gianluca Gennari, et al. A H.264 decoder robust to transmission errors http://primo.ismb.it/firb/docs/eusipco_paper.pdf. Last accessed Mar. 16, 2007.

Jill M. Boyce, et al. Packet Loss Effects on MPEG Video Sent Over the Public Internet. 1998, ACM. http://delivery.acm.org/10.1145/300000/290770/p181-boyce.pdf?key1=290770&key2=0030393711&coll=GUIDE&dl=GUIDE&CFID=16974873&CFTOKEN=73133604. Last accessed Mar. 16, 2007.

Office Action from the Patent Office of Japan regarding Application No. 2010-513301 dated Jun. 22, 2012.

Extended European Search Report from the European Patent Office regarding Application No. 08769724 dated Aug. 31, 2012.

Stockhammer et al., "H.264/AVC in Wireless Environments", IEEE Transactions on Circuits and Systems for Video Technology, IEEE Service Center, vol. 13, No. 7, Jul. 2003.

Weigand et al., "Draft ITU-T Recommendation and Final Draft International Standard of Joint Video Specification (ITU-T Rec. H.264 ISO/IEC 14496-10 AVC)", Joint Video Team (JVT) of ISO/IEC MPEG & ITU-T VCEG (ISO/IEC JTC1 SC29/WG11 and ITU-T SG16 Q.6), May 2003.

Etoh et al., Wireless Video Applications in 3G and Beyond, IEEE Wireless Communications, IEEE Service Center, vol. 12, No. 4, Aug. 2005.

Wang et al., "Error Control and Concealment for Video Communication: A Review", Proceedings of the IEEE, IEEE, vol. 86, No. 5, May 1998.

Claypool et al., "Using Interleaving to Ameliorate the Effects of Packet Loss in a Video Stream", Multimedia Signal Processing, 2002 IEEE Workshop, IEEE, May 2003.

Office Action from the Patent Office of Japan regarding Application No. 2010-513301 dated Mar. 15, 2013.

\* cited by examiner

| | | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|
| 1 | Video Capture | 0 | 1 | 2 | 3 | 4 | 5 | 6 | 7 | 8 | 9 | 10 | 11 | 12 | 13 | 14 | 15 | 16 | 17 | 18 | 19 | 20 |
| 2 | Encoder Input | 0 | 1 | 2 | 3 | 4 | 5 | 6 | 7 | 8 | 9 | 10 | 11 | 12 | 13 | 14 | 15 | 16 | 17 | 18 | 19 | 20 |
| 3 | Encoder | B0 | I1 | B2 | P3 | B4 | P5 | B6 | SP7 | B8 | P9 | B10 | P11 | B12 | I13 | B14 | P15 | B16 | P17 | B18 | SP19 | B20 |
| 4 | Encoder Output | | I1 | B0 | P3 | B2 | P5 | B4 | SP7 | B6 | P9 | B8 | P11 | B10 | I13 | B12 | P15 | B14 | P17 | B16 | SP19 | B18 |
| 5 | En. Out. Frame # | | 0 | 1 | 2 | 3 | 4 | 5 | 6 | 7 | 8 | 9 | 10 | 11 | 12 | 13 | 14 | 15 | 16 | 17 | 18 | 19 |
| 6 | En. Depend. F # | | 0 | 0 | 0 | 2 | 2 | 4 | 0 | 6 | 6 | 8 | 8 | 10 | 12 | 12 | 14 | 14 | 16 | 16 | 12 | 18 |
| 7 | | | | | 0 | | 2 | | 4 | | 6 | | 8 | | | | 12 | | 14 | | | 16 | |
| 8 | Decoder Input | | I1 | B0 | P3 | B2 | P5 | B4 | SP7 | B6 | P9 | B8 | P11 | B10 | I13 | B12 | P15 | B14 | P17 | B16 | SP19 | B18 |
| 9 | Decoder Output | | | B0 | I1 | B2 | P3 | B4 | P5 | B6 | SP7 | B8 | P9 | B10 | P11 | B12 | I13 | B14 | P15 | B16 | P17 | B18 |

FIG. 3

MECHANISMS TO CONCEAL REAL TIME VIDEO ARTIFACTS CAUSED BY FRAME LOSS

BACKGROUND

Throughout history, technological advancements have enabled simplification of common tasks and/or handling such tasks in more sophisticated manners that can provide increased efficiency, throughput, and the like. For instance, technological advancements have led to automation of tasks oftentimes performed manually, increased ease of widespread dissemination of information, and a variety of ways to communicate as opposed to face to face meetings or sending letters. According to another example, video communication has become a more prevalent manner by which communication can occur, where video data (e.g., with or without corresponding audio data) can be captured and transmitted to a disparate location for viewing. As such, the video data can be communicated in real time, stored in memory and transferred at a later time, and so forth.

Video communication where video data is obtained and transferred in real time, for instance, can be leveraged for teleconferencing. Teleconferences (e.g., audio and/or video conferences, . . . ) can allow a number of participants positioned at diverse geographic locations to collaborate in a meeting without needing to travel. Employment of teleconferencing techniques can enable businesses to reduce costs while at the same time increase efficiency since transacting meetings by teleconference can obligate a lesser amount of time, expense, and the like to attend in comparison to in person meetings, for example.

Conventional video communication technology, however, is subject to rendering of artifacts, which can be any perceived distortion in the video caused by frame loss. Even though numerous techniques have been developed to mitigate occurrence of frame loss, inherent lossiness of communication channels (e.g., data transferred over the Internet or any other type of network, . . . ) continues to cause a degree of frame loss for real time video communication. For example, frame loss can be caused by network packet loss, out of order packets, and so forth. Moreover, with common video encoding and transmission (e.g., MPEG video, . . . ), earlier frame loss can lead to a distorted image in following frames due to dependency between frames. It is not uncommon for frame loss to cause up to ten seconds of video artifact, for instance. To date, decoders have typically been unable to identify which frames have artifact due to frame loss. Accordingly, real time video communication systems oftentimes display corrupted frames rather than hiding, discarding, etc. these frames that have artifact since there is a lack of understanding concerning which frames have artifact.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate describing, communicating, utilizing, etc. a frame dependency structure in connection with real time video communication. For example, a protocol can be employed to communicate the dependency structure from a sender to a receiver. Moreover, a mechanism on a receiver side can detect frame(s) that will be rendered with artifacts if displayed due to previous frame loss; this mechanism can leverage receiver side knowledge concerning the dependency structure of the frames.

In accordance with various aspects of the claimed subject matter, a sending component can transfer a stream of encoded video frames to a receiving component. Each of the frames can be communicated as a plurality of packets. Moreover, each packet can include a sequence number that identifies the particular frame associated therewith as well as referral frame number(s) corresponding to frame(s) upon which the particular frame is dependent. Thus, each packet can communicate a portion of a dependency structure, which can be interpreted and employed by the receiving component to reconstruct the dependency between frames, identify frame loss and/or mitigate display of frames with artifacts based upon loss of earlier frames. Rather, video can be frozen for a period of time associated with frames that include artifacts. Accordingly, a perceived video quality can be improved. Pursuant to another illustration, frames skipped due to artifacts can be logged and/or reports can be generated based upon a qualitative model that measures how many frames include artifacts and the percentage of video frozen due to error concealment.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

BRIEF DESCRIPTION OF THE DRAWINGS

FIG. 3 illustrates a table that depicts an example video stream pattern that includes I frames, B frames, P frames, and SP frames.

DETAILED DESCRIPTION

Figure 1:
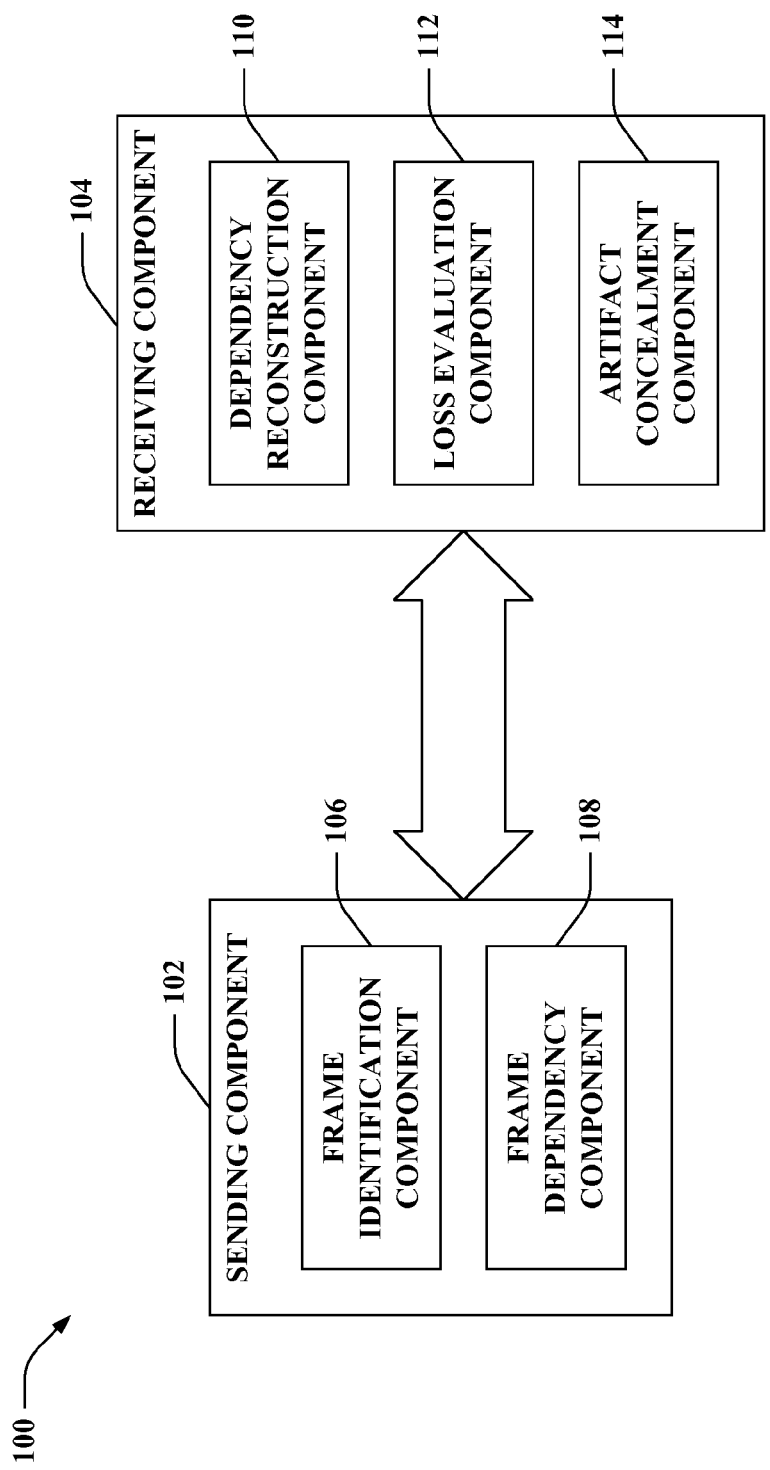
FIG. 1 illustrates a block diagram of an example system that provides and utilizes information related to dependency between frames for real time video communication.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that provides and utilizes information related to dependency between frames for real time video communication. The system 100 includes a sending component 102 and a receiving component 104 that can communicate any type of data (e.g., related to video, audio, image, text, document, . . . ) by way of any type of connection. For example, the sending component 102 can encode and transmit video data (e.g., and/or audio data) to the receiving component 104 in real time (e.g., utilizing the real time transport protocol (RTP)); accordingly, a stream of video frames can be transferred. Although one sending component 102 and one receiving component 104 are depicted, it is to be appreciated that the system 100 can include substantially any number of sending components similar to the sending component 102 and/or receiving components similar to the receiving component 104. Moreover, the system 100 can enable switching such that the sending component 102 alters to a receiving component and/or the receiving component 104 transitions to a sending component at a disparate time (e.g., switching based upon an identity of the component(s) 102-104 associated with an active speaker at a particular time, manual switching, . . . ). The sending component 102 and/or the receiving component 104 can be personal computers, cellular phones, smart phones, laptops, handheld communication devices, handheld computing devices, gaming devices, personal digital assistants (PDAs), dedicated teleconferencing systems, consumer products, automobiles, and/or any other suitable devices.

It is to be appreciated that the system 100 can employ any type of network architecture. Thus, for example, the sending component 102 and the receiving component 104 can transfer data there between employing a peer-to-peer architecture (e.g., the sending component 102 and the receiving component 104 can be endpoints that directly communicate with one another over a network connection for point to point video communication, . . . ). According to another illustration, data transferred between the sending component 102 and the receiving component 104 can traverse through a network that includes disparate component(s) (not shown) (e.g., an audio/video multi-point control unit (AVMCU) that can be a bridge that interconnects several endpoints such as the sending component 102 and the receiving component 104 and enables routing data there between, . . . ). Pursuant to an example, a multi-party teleconference can leverage a network architecture that includes an AVMCU (e.g., multi-party video communication can employ the system 100 without incurring frame recount and dependency recalculation/repopulation of the AVMCU server).

The sending component 102 can include a frame identification component 106 and a frame dependency component 108. The frame identification component 106 can determine a type (e.g., I frame, SP frame, P frame, B frame, etc. as described in FIG. 2 below) of a frame to be transmitted by the sending component 102. Pursuant to an example, the frame identification component 106 can employ a dependency structure that can allocate types to frames (e.g., based upon a temporal order of the frames, . . . ). Moreover, the frame identification component 106 can assign a unique sequence number to the frame to be transmitted. Thus, the frame identification component 106 can enable encoding the unique sequence number (e.g., frame count) in a payload header of each packet included in the frame.

The frame dependency component 108 can evaluate a dependency of a frame to be transferred by the sending component 102. The dependency can be based upon the type of frame; hence, the frame dependency component 108 can utilize the type of the frame as determined by the frame identification component 108 to decipher the dependency of that frame. The frame dependency component 108 can also utilize the dependency structure to evaluate the dependency of the frame. According to an example, the frame dependency component 108 can enable encoding frame dependency information (e.g., referral frame number(s), . . . ) in the payload header of each packet of the frame.

By employing the frame identification component 106 and the frame dependency component 108, the sending component 102 can provide a mechanism to describe the frame dependency structure. Moreover, this frame dependency structure can be communicated to the receiving component 104 (e.g., by way of the protocol described herein). In contrast, conventional techniques oftentimes fail to provide a manner by which the receiving component 104 can understand, interpret, employ, etc. the frame dependency structure.

The receiving component 104 can further include a dependency reconstruction component 110, a loss evaluation component 112 and an artifact concealment component 114. The dependency reconstruction component 110 can evaluate the data incorporated into the obtained frames (e.g., in the payload headers) to reassemble the dependency structure between a plurality of frames. For example, the frame sequence numbers and the referral frame numbers associated with the received frames can allow the dependency reconstruction component 110 to analyze the dependencies between frames.

Additionally, the loss evaluation component 112 can identify missing frames transferred by the sending component 102. According to an example, the loss evaluation component 112 can track frame arrival, corruption within a received frame, and so forth. By way of another illustration, the sequence number of frames included by the frame identification component 106 of the sending component 102 can be evaluated by the loss evaluation component 112 to determine whether or not each frame has been successfully received. Thus, the loss evaluation component 112 can identify that frames 1, 2, and 4 as assigned at the sending component 102 have been properly obtained by the receiving component 104, yet frame 3 has not been received (e.g., one or more packets from frame 3 are lost, out of order, corrupt, . . . ), for example.

Moreover, the artifact concealment component 114 analyzes the impact of frame loss based upon the type and position within the sequence of the lost frame. Further, the artifact concealment component 114 can enable freezing a rendered output rather than displaying an artifact; thus, corrupted frames can be hidden, discarded, etc. rather than displayed with the artifact since video artifact can have a substantial negative impact on perceived quality (e.g., psycho visual quality). The artifact concealment component 114 can utilize the dependency structure discerned by the dependency reconstruction component 110 and/or the lost frames identified by the loss evaluation component 112 to determine which frames can present artifact due to frame loss. Moreover, the artifact concealment component 114 can hide a frame identified as including artifact if displayed. Thus, the artifact concealment component 114 can allow continuing to display a frame that lacks artifact for an extended amount of time (e.g., via freezing a rendered display) rather than showing a frame that includes artifact. By leveraging the dependency structure communicated from the sending component 102, the artifact concealment component 114 can determine a corresponding amount of time to freeze the video; in contrast, conventional techniques typically are unable to identify the extent of an effect of frame loss.

It is to be appreciated that the sending component 102 and/or the receiving component 104 can include respective interface components (not shown). The interface components can leverage various adaptors, connectors, channels, communication paths, etc. to enable interaction there between.

Figure 2:
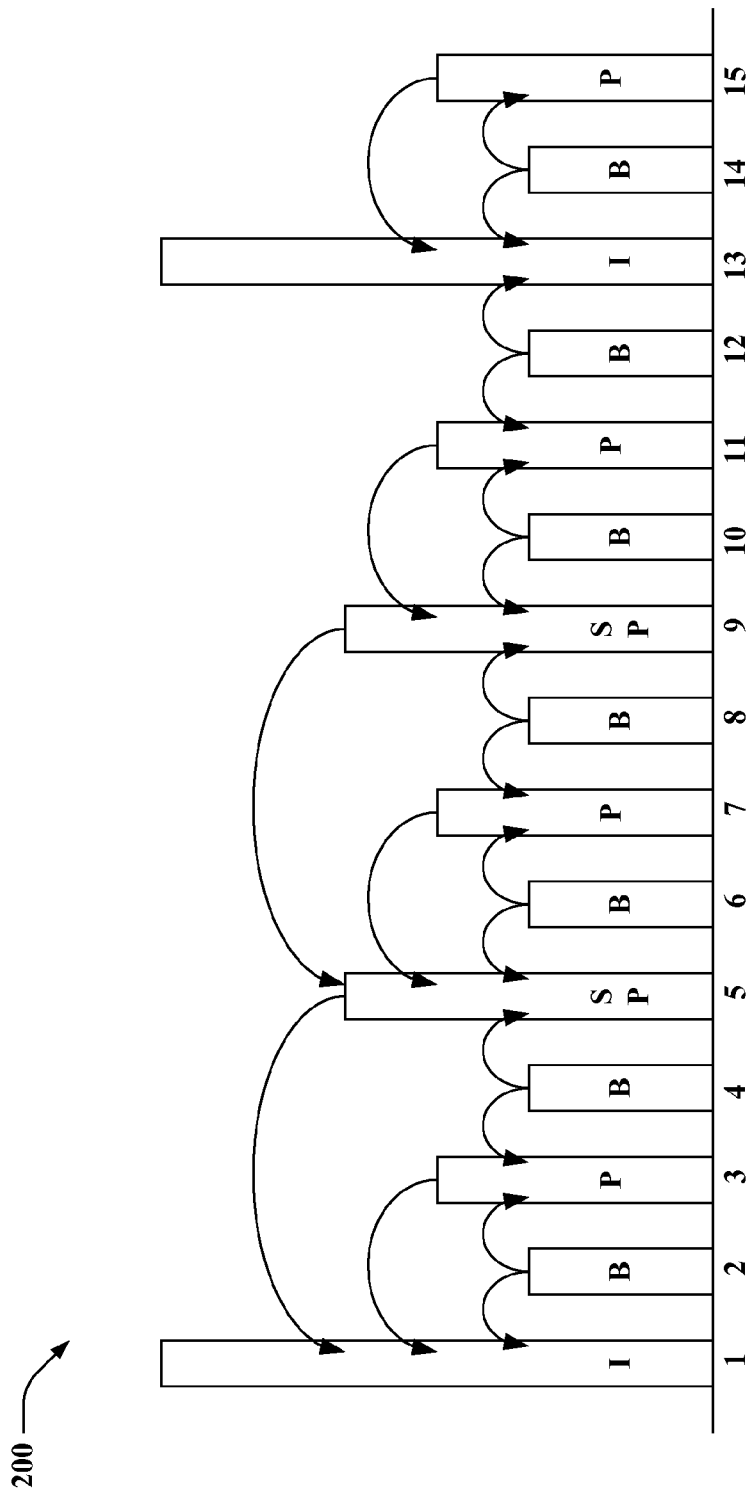
FIG. 2 illustrates an example video stream framing pattern utilized with real time video communication in accordance with various aspects.

Now referring to FIG. 2, illustrated is an example video stream framing pattern 200 utilized with real time video communication in accordance with various aspects. Various types of frames can be supported for video encoding. Moreover, arrows illustrated in FIG. 2 represent the dependency of each of the frames (e.g., referral frames). For example, as shown in the framing pattern 200, a frame can be an intra frame (I frame), a prediction frame (P frame), a bidirectional frame (B frame), or super prediction frame (SP frame). The framing pattern 200 is provided as an example, and it is to be appreciated that the claimed subject matter is not so limited (e.g., any number of frames can be included between I frames, additional or fewer frame types can be employed, differing dependencies can be utilized, . . . ).

I frames are independent frames that do not depend upon any other frames. I frames are encoded statically, have a significant amount of the details and content (e.g., in comparison to other types of frames), and are typically larger in size compared to other types of frames. An SP frame includes encoded difference information (e.g., delta) based upon a comparison with a previous I frame or SP frame; thus, as represented in the framing pattern 200, a particular SP frame depends from the previous I frame or previous SP frame that happens to be nearest to the particular SP frame (e.g., SP5 refers to I1, SP9 refers to SP5, . . . ). Closeness can be evaluated based upon the assigned sequence number (e.g., frame count). A P frame includes encoded difference information (e.g., delta) based upon a comparison with a previous I frame, SP frame or P frame. Moreover, a B frame includes encoded difference information (e.g., delta) based upon a two directional comparison with a previous I frame, SP frame or P frame and a following P frame or SP frame. B frames, hence, refer to two disparate frames.

An I frame begins a group of pictures (GOP), which continues until the following I frame. It is contemplated that the GOP can include any number of frames (e.g., about 150, . . . ). Only the I frame in the GOP is independent from the other frames in the GOP; for example, I1 and I13 do not refer to any other frames. Moreover, the remaining frames (e.g., SP frames, P frames, B frames, . . . ) depend from other frames such that the deltas can be encoded rather than the data in its entirety. Further, each GOP is independent of disparate GOPs.

Each frame in the framing pattern 200 can include 1 to N packets, where N can be substantially any integer. Further, the number of packets can be a function of the size of the frame (e.g., which can be based upon the contents of the video). Loss of any packet (e.g., as determined by the loss evaluation component 112 of FIG. 1) can cause an entire frame to be dropped.

Moreover, the impact of frame loss depends on the type and position of the frame that is lost. In particular, frames that refer to a lost frame will include artifact. Thus, if an I frame is lost, all following frames in the current GOP will have artifact; only the next I frame will provide correction. According to another example, if an SP frame is lost, all frames after that SP frame will have artifact until the end of the current GOP (e.g., the next I frame will correct the loss of an SP frame). Pursuant to another illustration, if a P frame is lost, all frames before a next SP frame or I frame, which ever happens to occur sooner, will exhibit artifact. Further, a B frame only causes loss of one frame (e.g., the B frame itself since no other types of frames refer to B frames); hence, the effect of such loss does not propagate and no artifact results.

Now turning to FIG. 3, illustrated is a table 300 that depicts an example video stream pattern that includes I frames, B frames, P frames, and SP frames. The table 300 can provide a global view of a dependency structure. It is contemplated that the table 300 can correspond to the video stream framing pattern 200 of FIG. 2. Moreover, it is to be appreciated that the table 300 is provided to illustrate an example of dependency between frames, and the claimed subject matter is not limited to such example.

Row 1 of the table 300 includes a sequence of frames obtained from a video capture device in temporal order. Row 2 of the table shows an input to an encoder; the encoder input can be substantially similar to the sequence of frames obtained from the video capture device. Row 3 illustrates an internal view of encoding effectuated by the encoder for each frame. In particular, each frame is associated with a type (e.g., I frame, B frame, P frame, SP frame, . . . ) based upon its position in the temporal ordering. Row 4 shows output from an encoder. For example, the B2 frame can be output after the P3 frame. Also, the encoder can send two P frames (e.g., P3 and P5) followed by the B frame (e.g., B4) that depends from such P frames, which can be reordered on the receive side to be a P frame (e.g., P3)—B frame (e.g., B4)—P frame (e.g., P5). It is to be appreciated, however, that the claimed subject matter is not limited to this manner of ordering encoded frames sent over the wire. Row 5 illustrates a sequence number (e.g., frame count) assigned to each of the frames output from the encoder as shown in row 4. For example, the sequence numbers in row 5 can be allotted by the frame identification component 106 of FIG. 1. Rows 6 and 7 illustrate referral frame numbers for each output frame in row 4. The referral frame numbers pertain to the sequence number assigned in row 4 of the frame from which each particular frame depends. These referral numbers can be yielded by the frame dependency component 108 of FIG. 1. Moreover, each B frame can be associated with two referral numbers, whereas the SP frames and P frames can be associated with one referral number each; also, since the I frames are independent, their referral numbers can point to themselves. Row 8 shows decoder input frames. Further, row 9 depicts decoder output frames; for example, B2 and P3 can be reordered as part of the output from the decoder.

Figure 4:
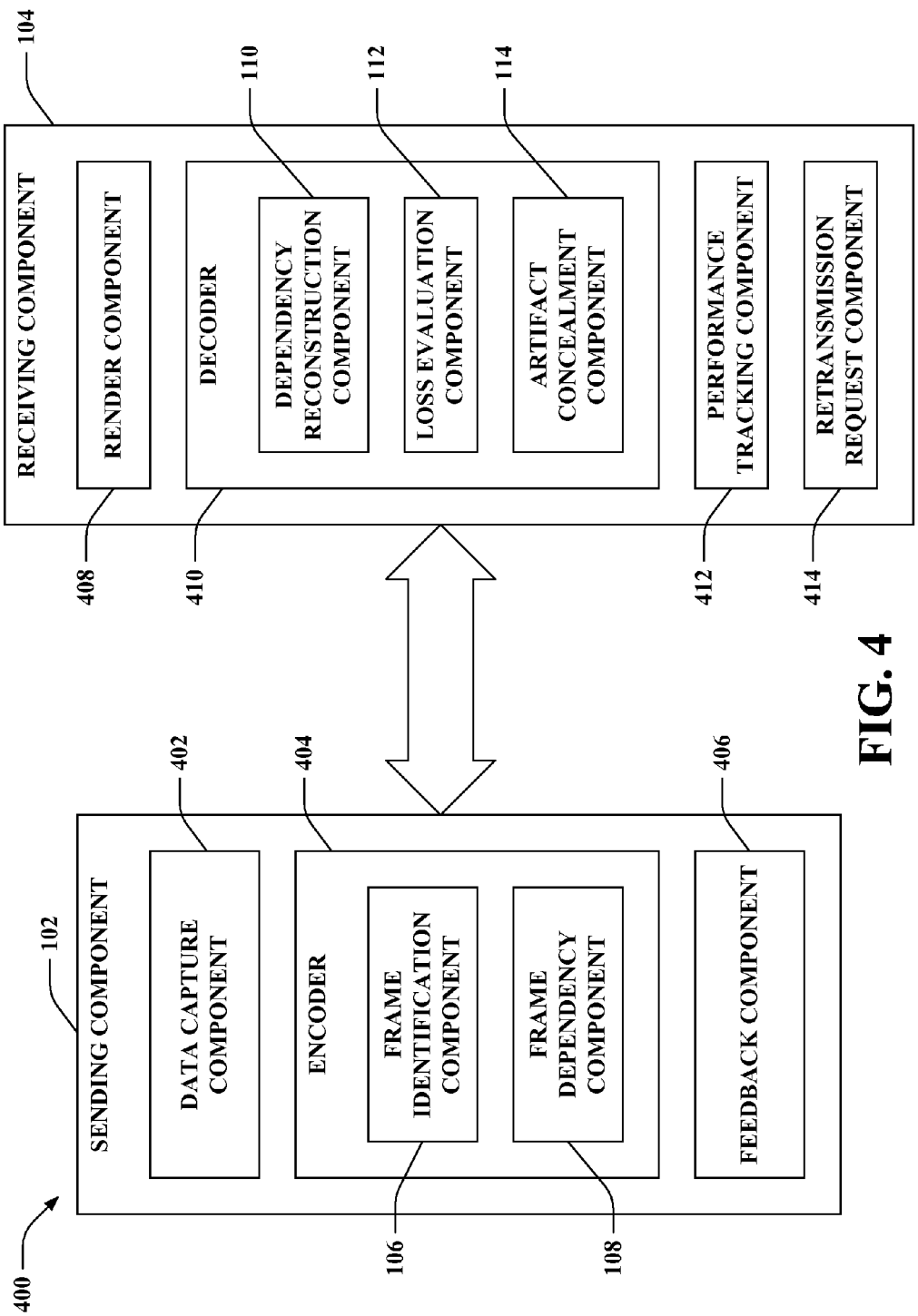
FIG. 4 illustrates a block diagram of an example system that manages loss of real time video frames.

With reference to FIG. 4, illustrated is a system 400 that manages loss of real time video frames. The system 400 includes the sending component 102 and the receiving component 104 that can communicate with each other. The sending component 102 can further include the frame identification component 106 and/or the frame dependency component 108. Also, the receiving component 104 can include the dependency reconstruction component 110, the loss evaluation component 112, and/or the artifact concealment component 114.

The sending component 102 can additionally include a data capture component 402, an encoder 404, and a feedback component 406. The data capture component 402 can obtain external data such as video, images, sounds, text, etc. According to an example, the data capture component 402 can be a camera (e.g., video camera), microphone, a combination thereof, and the like. Moreover, the data capture component 402 can collect a sequence of frames (e.g., video frames). Further, it is contemplated that the data capture component 402 can enable retrieving previously obtained data from memory for transfer to the receiving component 104.

The encoder 404 can encode the signal (e.g., video frames) collected by the data capture component 402 for transmission to the receiving component 104. Pursuant to an illustration, the encoder 404 can compress the collected data. Further to this example, the encoder 404 can compress a subset of frames independently (e.g., I frames) and the remainder of the frames based upon deltas from referral frames (e.g., according to the dependency structure). Moreover, multiple layers of dependency can be employed by the encoder 404. Additionally or alternatively, the encoder 404 can encrypt the video frames, add redundancy, and so forth. According to a further example, the encoder 404 can remove one or more frame types from the stream sent to the receiving component 104 (e.g., B frames can be removed, B frames and P frames can be removed, . . . ); it is also contemplated that the receiving component 104 can forgo processing one or more frame types, an AVMCU can halt routing of one or more frame types, and so forth.

As depicted, the encoder 404 can include the frame identification component 106 and the frame dependency component 108; however, it is contemplated that frame identification component 106 and/or the frame dependency component 108 can be separate from the encoder 404. The frame identification component 106 can enable the encoder 404 to assign a type to each frame (e.g., I frame, B frame, P frame, SP frame, . . . ); the type assignment can be based upon the dependency structure. Also, the frame identification component 106 can allocate a frame sequence number (e.g., frame count) to each frame. For instance, every frame outputted by the encoder 404 can be assigned a frame count that is incremented by one from the frame count of the frame outputted immediately prior. Moreover, the frame counts and corresponding types for frames outputted by the encoder 404 can be retained in a data store (not shown) associated with the sending component 102. The stored frame counts and types for past frames can be utilized by the frame dependency component 108 to calculate the referral frame number for each output frame yielded by the encoder 404.

The data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data store can be a server, a database, a hard drive, and the like.

The encoder 404, for example, can generate N packets for each of the frames, and these N packets can be transferred from the sending component 102 to the receiving component 104. Each packet yielded by the encoder 404 can include a payload header (as described below in FIGS. 5 and 6) and a payload. The payload header can include information pertaining to the dependency structure. Further, the payload can include at least a portion of the content of the frame corresponding to the packet.

The feedback component 406 can obtain performance reports, channel bandwidth analyses, retransmission requests, etc. from the receiving component 104 (and/or any disparate component(s) (not shown) in a network through which data traverses). Moreover, the feedback component 406 can effectuate modifying the output of the encoder 404 based upon the received feedback.

The receiving component 104 can additionally include a render component 408, a decoder 410, a performance tracking component 412 and a retransmission request component 414. The render component 408 can generate an output based upon the received data. By way of example, the render component 408 can be a display upon which real time video obtained by the receiving component 104 can be presented. It is contemplated that the render component 408 can generate any type of output (e.g., audile, visual, physical movement, . . . ) in response to the data obtained by the receiving component 104. According to another example, the render component 408 can enable storing the generated output in a data store (not shown) associated with the receiving component 104.

The decoder 410 can include the dependency reconstruction component 110, the loss evaluation component 112, and/or the artifact concealment component 114 as shown; however, it is contemplated that one or more of these components 110-114 can be separate from the decoder 410. The decoder 410 can reverse the encoding effectuated by the encoder 404. For example, the decoder 410 can obtain the packets corresponding to each frame, and process such packets to yield an output that can be provided to the render component 408. The decoder 410 can enable rendering of frames that do not have artifact, while inhibiting rendering of frames that have artifact. Moreover, the decoder 410 (and/or the dependency reconstruction component 110 and/or the loss evaluation component 112) can generate a frame dependency table utilized to track whether a frame arrives successfully and can be decoded successfully. The following provides an example of such a frame dependency table.

| | Frame Count | | | | | | | |
|---|---|---|---|---|---|---|---|---|
| | 0 | 1 | 2 | 3 | 4 | 5 | 6 | 7 |
| Arrival | 1 | 0 | 1 | 1 | 1 | 0 | 1 | 1 |
| Decode | 1 | 0 | 0 | 1 | 1 | 0 | 1 | 1 |

As shown, if a frame arrives successfully (e.g., as determined by the loss evaluation component 112), the corresponding slot in the table can be marked as arrival=true ("1"). If a frame does not arrive, the corresponding slot can be set as arrival=false ("0"), decode=false ("0"). Moreover, if a particular frame's referral frame(s) (e.g., as determined by the dependency reconstruction component 110) can be decoded successfully, then the particular frame can be decoded successfully as well and the corresponding slot can be marked as decode=true ("1"). Further, if a particular frame's referral frame's decode value=false ("0"), then the particular frame's decode value is also false. Thereafter, the artifact concealment component 114 can enable determining which frame(s) will exhibit artifact, and thus, can identify when to freeze and/or unfreeze an output displayed upon the render component 408. It is to be appreciated, however, that the claimed subject matter is not limited to utilization of the frame dependency table described herein.

The receiving component 104 can also include the performance tracking component 412 that logs and/or reports skipped frames due to artifact, which can be an indicator of video quality degrade due to artifact/frame loss. The performance tracking component 412 can yield a report based upon a qualitative model that measures how many frames include artifact, a percentage of video frozen due to error concealment (e.g., by the artifact concealment component 114), and the like. The performance tracking component 412 can accurately measure video quality degrade due to frame loss, where the frame loss can be caused by network packet loss, rate matching, etc. According to an example, the performance tracking component 412 can utilize the frame dependency table to generate the report. Moreover, the performance tracking component 412 can transmit the report to the feedback component 406 of the sending component 102 (e.g., to effectuate modifying operation of the encoder 404, . . . ), retain the report in the data store associated with the receiving component 104, and so forth.

Further, the receiving component 104 can include the retransmission request component 414 that transmits a request to the sending component 102 (e.g., the feedback component 406, . . . ) for a new I frame (and/or an I frame or SP frame in the case of loss of a P frame) to be transferred to the receiving component 104. For example, if the retransmission request component 414 (and/or the decoder 410) notices greater than a threshold amount of time with artifact (e.g., 1 second, . . . ), the request for a new frame can be sent. According to another illustration, when loss of an I frame, SP frame, or P frame is detected, the retransmission request 414 can send a request. The feedback component 406 can process the request, for example, and within one round trip time (RTT), a new I or SP frame can arrive at the receiving component 104 to correct the video artifact.

Additionally, although not depicted, it is contemplated that the sending component 102 and/or the receiving component 104 can include a switching component that enables activating and deactivating utilization of the frame dependency mechanism described herein. For example, the switching component can enable turning the frame dependency mechanism on or off while mitigating interoperability issues between the sending component 102 and the receiving component 104.

Figure 5:
FIGS. 5 and 6 illustrate example payload headers.
Figure 6:

Turning now to FIGS. 5 and 6, illustrated are example payload headers 500 and 600. Each packet communicated (e.g., between the sending component 102 and the receiving component 104) can include one of the payload headers 500 and 600. Further, the payload header 500 of FIG. 5 can be employed with an I frame, a P frame or an SP frame, while the payload header 600 of FIG. 6 can be utilized for a B frame.

The payload headers 500 and 600 are part of the real time video packet, along with a payload that includes frame content. The payload headers 500 and 600 each include a frame count (and a high frame count (H-FC)) associated with the corresponding frame as well as referral frame number(s) (e.g., the payload header 500 includes one referral frame number while the payload header 600 can include two referral frame numbers) (and high referral frame number(s) (H-RF)). In the payload header 600 for the B frame, the referral frame number field can be split for the next and the previous referral frame numbers. Additionally, the payload headers 500 and 600 can include the following: F can be FirstPacket; H can be Sequence Header exists; K can be Key frame; O can be Fixed to One; L; S can be SP frame; C can be cached frame; and M can be Mode. The payload headers 500 and 600 can have Mode set to 1. Additionally, further extension of the packetization header is contemplated by setting the Mode bit in the extended section (illustrated as equal to zero) to be equal to 1 to obtain another 4 bytes.

Figure 7:
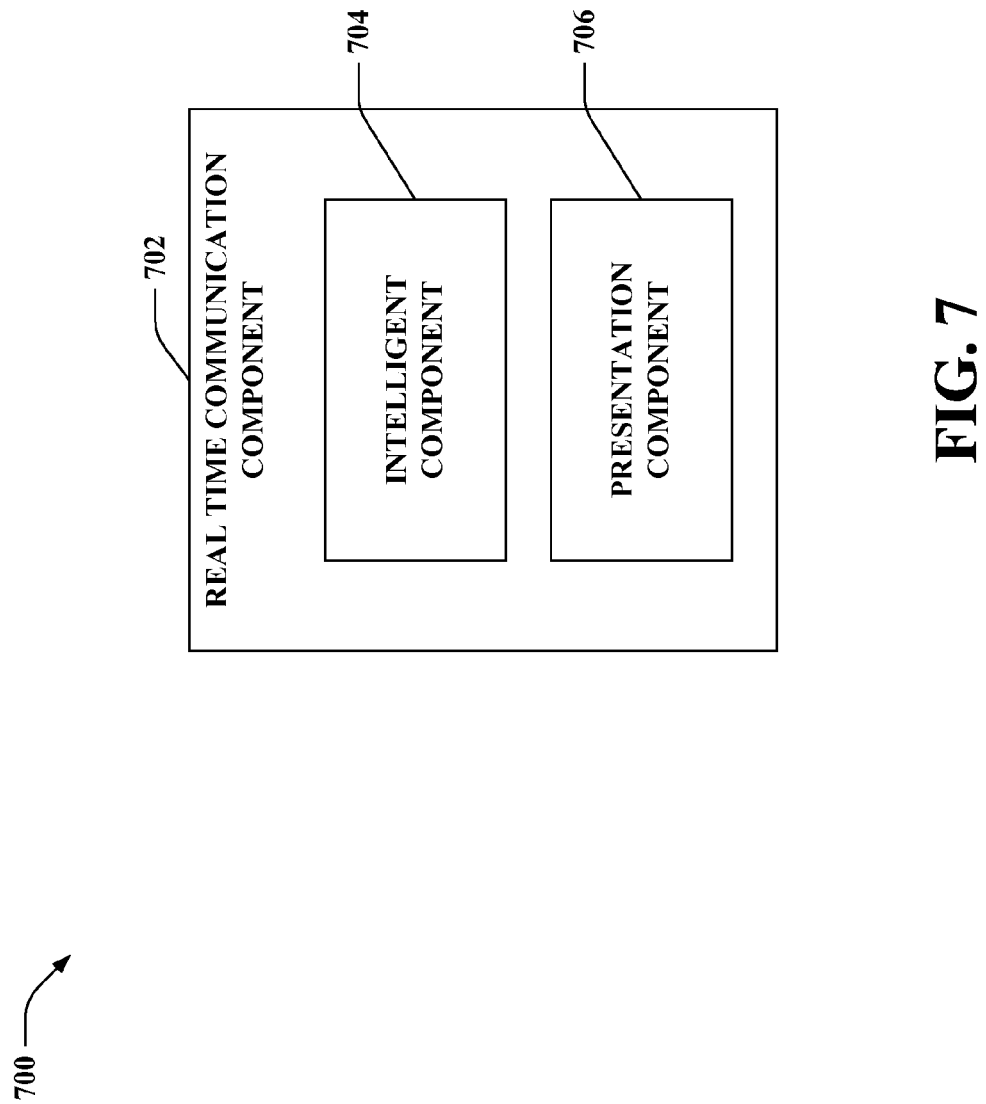
FIG. 7 illustrates a block diagram of an example system that infers whether to conceal real time video artifacts caused by frame loss.

Turning to FIG. 7, illustrated is a system 700 that infers whether to conceal real time video artifacts caused by frame loss. The system 700 can include a real time communication component 702, which can be substantially similar to the sending component 102 or the receiving component 104 described above. The real time communication component 702 can further include an intelligent component 704 and/or a presentation component 706. The intelligent component 704 can be utilized by the real time communication component 702 to reason about whether to freeze or unfreeze rendered video output. Further, the intelligent component 704 can evaluate a context, state, situation, etc. associated with the real time communication component 702 to infer whether artifacts exist, whether to conceal artifacts, whether to request retransmission of frames, dependencies between frames, and so forth.

It is to be understood that the intelligent component 704 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 706 can provide various types of user interfaces to facilitate interaction between a user and any component coupled to the real time communication component 702. As depicted, the presentation component 706 is incorporated into the real time communication component 702. However, it is to be appreciated that the presentation component 706 and/or similar view components can be separate from the real time communication component 702 and/or a stand-alone unit. The presentation component 706 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the real time communication component 702.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
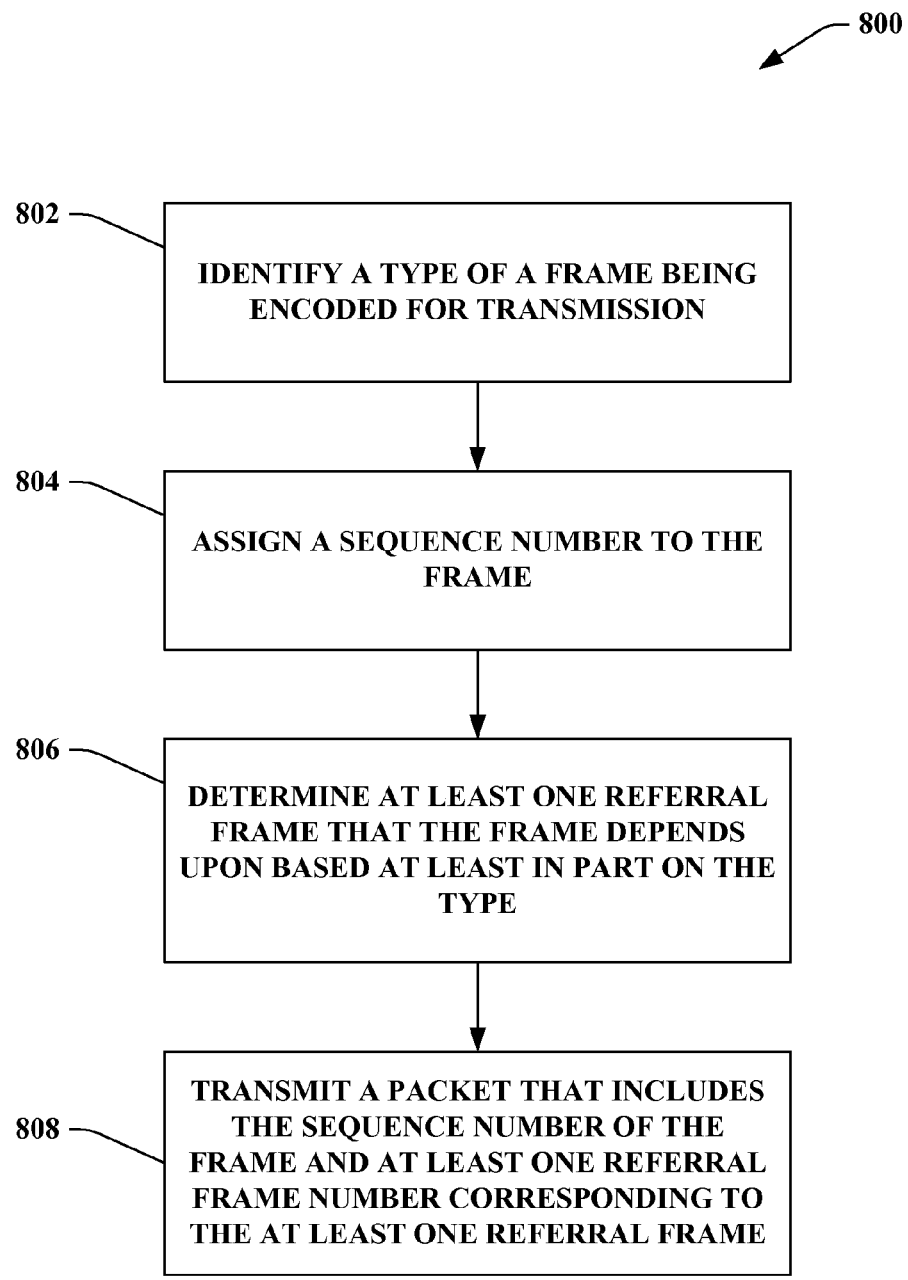
FIG. 8 illustrates an example methodology that facilitates describing a dependency structure between real time video communication frames.
Figure 9:
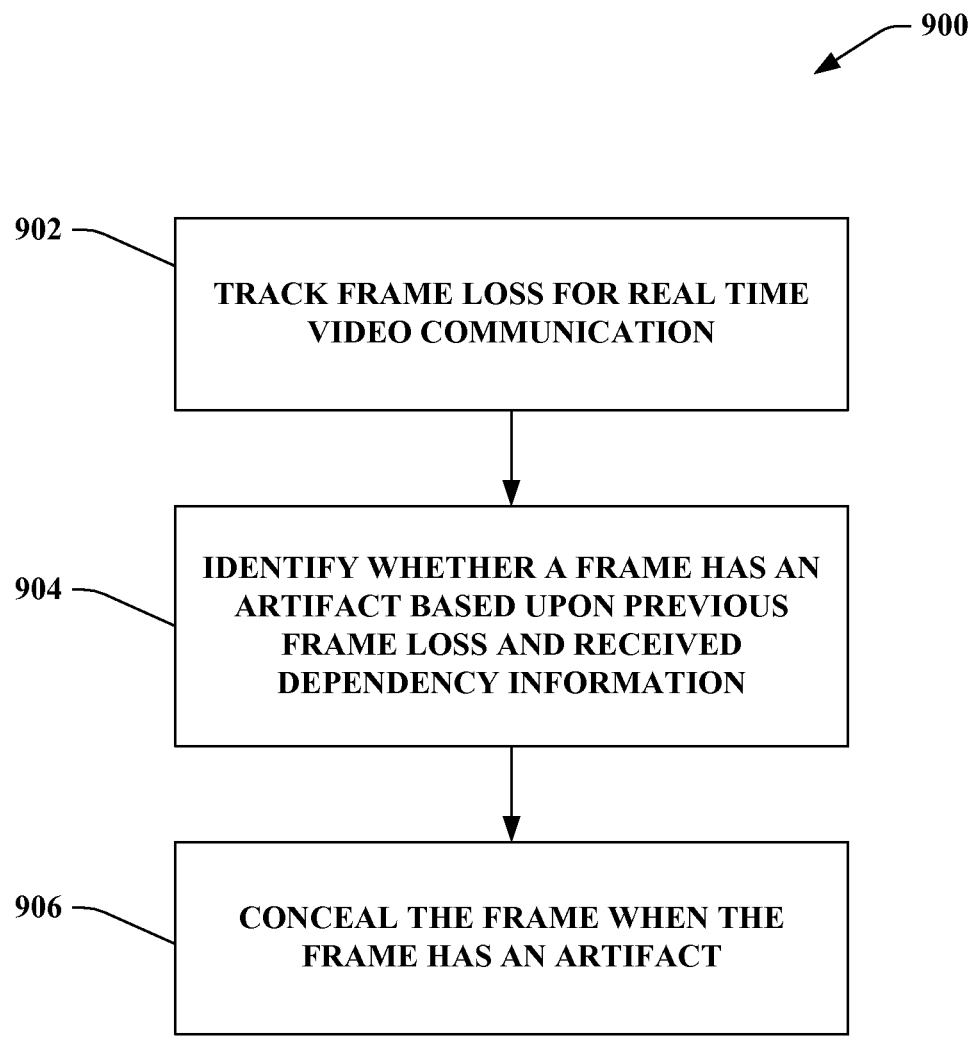
FIG. 9 illustrates an example methodology that facilitates concealing artifacts based upon frame loss.

FIGS. 8-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

Turning to FIG. 8, illustrated is a methodology 800 that facilitates describing a dependency structure between real time video communication frames. At 802, a type of a frame being encoded for transmission can be identified. For example, the frame can be an I frame, a B frame, a P frame, an SP frame, etc. Moreover, the type can be based upon a known dependency structure. At 804, a sequence number can be assigned to the frame. Additionally, the sequence number of the frame and previously encoded frames can be retained (e.g., in memory). At 806, at least one referral frame that the frame depends upon can be determined based at least in part on the type. Moreover, the dependency structure can specify dependencies for each frame type. At 808, a packet that includes the sequence number of the frame and at least one referral frame number corresponding to the at least one referral frame can be transmitted. For example, the frame can include any number of packets, and each of the packets can include the sequence number and the at least one referral frame number. Moreover, each packet can include a payload header and a payload; the payload header can include the sequence number and the at least one referral frame number, while the payload can include the frame content.

Referring now to FIG. 9, illustrated is a methodology 900 that facilitates concealing artifacts based upon frame loss. At 902, frame loss can be tracked for real time video communication. For example, received packets of frames can each include a unique, frame specific sequence number; thus, frames that have not been successfully received (e.g., due to packet loss, out of order packets, . . . ) can be identified based upon the sequence number. At 904, whether a frame has an artifact can be identified based upon previous frame loss and received dependency information. Pursuant to an illustration, dependency information (e.g., frame(s) from which the frame depends) can be included with received packets corresponding to the frame. At 906, the frame can be concealed when the frame has an artifact. Accordingly, decoding of the artifact can be inhibited and/or the video can be frozen for a period of time associated with frames that have artifacts (rather than rendering video with artifacts). Moreover, concealed frames can be tracked to yield a report, which can be communicated to an encoder. Further, when a number frames with artifacts exceeds a predetermined threshold, a request to resend an I frame (and/or an SP frame) can be transmitted to the encoder.

Figure 10:
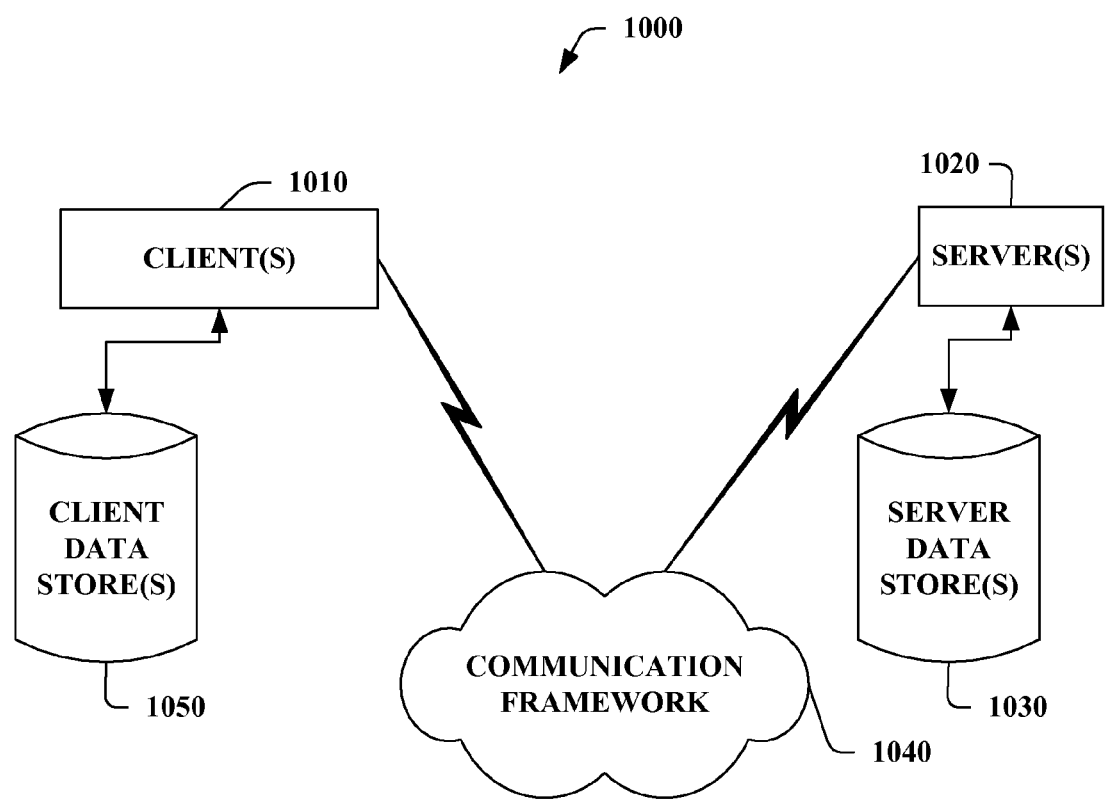
FIG. 10 illustrates an example networking environment, wherein the novel aspects of the claimed subject matter can be employed.
Figure 11:
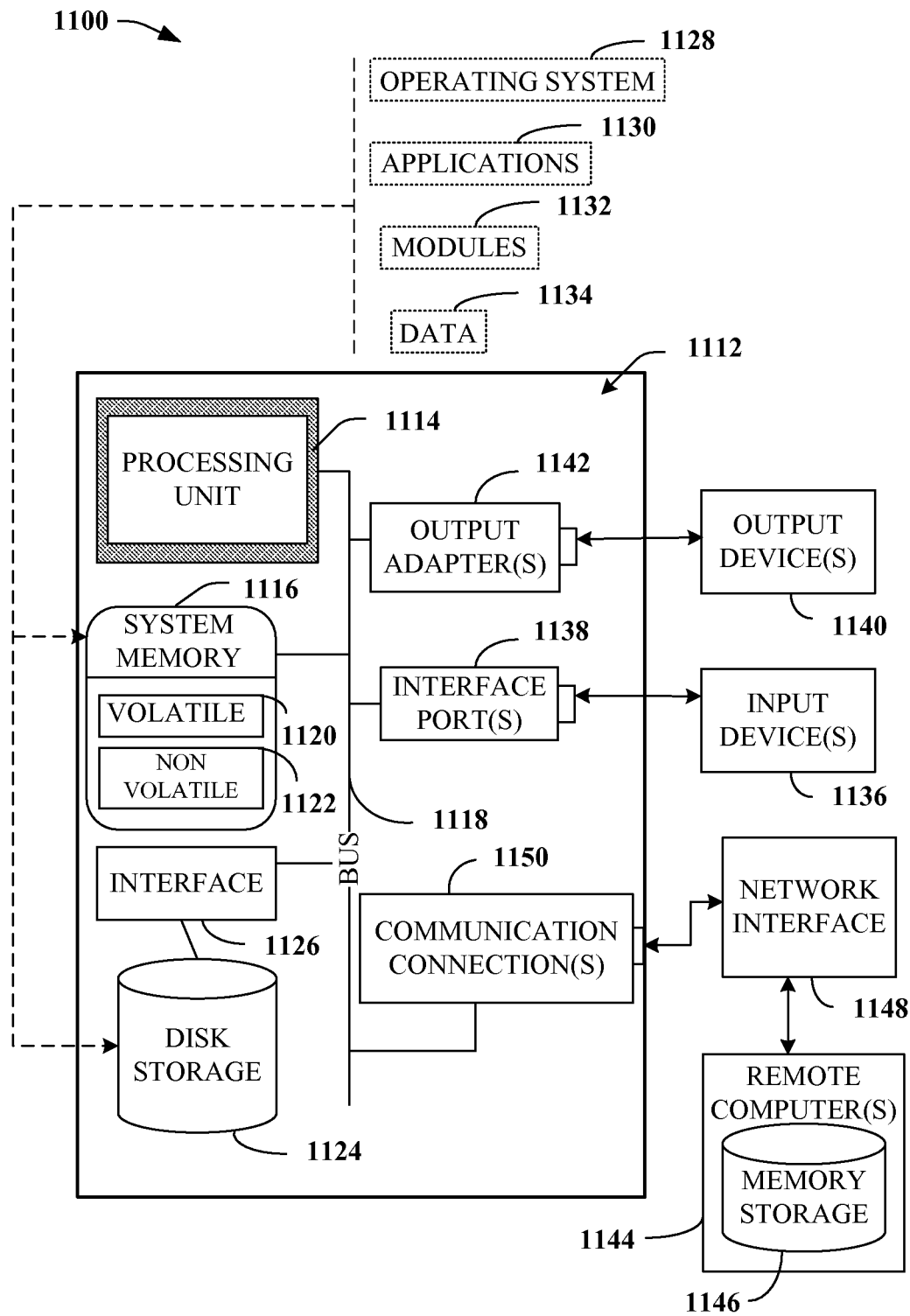
FIG. 11 illustrates an example operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. For instance, FIGS. 10-11 set forth a suitable computing environment that can be employed in connection with generating text data and/or outputting such data for closed captions associated with a real time conference. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for real time video communication, comprising:
    a processor for executing computer-executable components; and
    memory storing computer-executable components including:
        a dependency reconstruction component that evaluates dependency data incorporated into each frame of a plurality of frames to reassemble a dependency structure for the plurality of frames, wherein:
            the dependency reconstruction component receives the plurality of frames from a sending component that transfers each of the plurality of frames,
            the sending component is configured to assign sequence numbers for the plurality of frames and embed dependency data in the plurality of frames based upon the dependency structure in accordance with frame types and the sequence numbers,
            each frame in the plurality of frames includes a unique sequence number for identifying a frame count of the frame,
            the dependency structure specifies that a particular frame is dependent upon one or more previous frames for decoding, and
            the dependency data for the particular frame includes a referral frame number of each previous frame upon which the particular frame is dependent;
        a loss evaluation component that tracks frame loss and identifies lost frames based upon the sequence numbers for the plurality of frames; and
        an artifact concealment component that inhibits rendering of frames with artifacts based upon the dependency structure and frame loss, wherein the artifact concealment component conceals the particular frame when the dependency data for the particular frame includes a referral frame number that corresponds to a lost frame.

2. The system of claim 1, wherein the sending component is configured to alter operation of an encoder based upon a received performance report, channel bandwidth analysis, or retransmission request.

3. The system of claim 1, wherein each of the plurality of frames is received via a point to point video communication environment or a multi-party video communication environment that includes an audio/video multi-point control unit (AVMCU).

4. The system of claim 1, wherein the dependency structure specifies dependencies for a plurality of frame types.

5. The system of claim 4, wherein the frame types include intra frames (I frames), prediction frames (P frames), bidirectional frames (B frames), and super prediction frames (SP frames).

6. The system of claim 1, wherein the computer-executable components further include:
    a performance tracking component that logs and reports skipped frames determined to include artifacts by the artifact concealment component.

7. The system of claim 1, wherein the computer-executable components further include:

a retransmission request component that transmits a request for a resending a new I frame when a number of frames with artifacts exceeds a predetermined threshold.

8. The system of claim 1, wherein:
the particular frame comprises a plurality of packets, and each of the plurality of packets comprises a payload header that includes the sequence number of the particular frame and each referral frame number of each previous frame upon which the particular frame is dependent.

9. The system of claim 1, wherein the computer-executable components further include:
a switching component that activates and deactivates a frame dependency mechanism while mitigating interoperability issues between the sending component and a receiving component.

10. The system of claim 1, wherein the artifact concealment component enables rendering of frames that lack an artifact.

11. The system of claim 1, wherein the computer-executable components further include:
a decoder that decodes encoded frames; and
a render component that renders decoded frames to display real time video.

12. The system of claim 1, wherein:
the artifact concealment component skips frames determined to include artifacts,
the particular frame is determined to include an artifact by the artifact concealment component, and
one or more frames having dependency data including a referral frame number that corresponds to the particular frame are determined to include artifacts by the artifact concealment component.

13. A method for real time video communication, comprising:
identifying, by a computing device, a plurality of frames to be encoded for transmission;
assigning, by the computing device, sequence numbers for the plurality of frames, wherein each sequence number of each frame identifies a frame count of each frame in the plurality of frames;
embedding, by the computing device, dependency data in the plurality of frames based upon a dependency structure for the plurality of frames in accordance with frame types and the sequence numbers, wherein:
the dependency structure specifies that a particular frame is dependent upon one or more previous frames for decoding, and
the dependency data for the particular frame includes a referral frame number of each previous frame upon which the particular frame is dependent; and
transmitting, by the computing device, the plurality of frames to a receiving component that is configured to:
evaluate the dependency data incorporated into each frame of the plurality of frames to reassemble the dependency structure for the plurality of frames,
track frame loss and identify lost frames based upon the sequence numbers for the plurality of frames; and
inhibit rendering of frames with artifacts based upon the dependency structure and frame loss, wherein the particular frame is concealed when the dependency data for the particular frame includes a referral frame number that corresponds to a lost frame.

14. The method of claim 13, wherein the dependency structure specifies dependencies for a plurality of frame types.

15. The method of claim 13, wherein:
the particular frame comprises a plurality of packets, and each of the plurality of packets comprises a payload header that includes the sequence number of the particular frame and each referral frame number of each previous frame upon which the particular frame is dependent.

16. The method of claim 13, further comprising:
receiving, by the computing device, a report that indicates how many frames include artifacts.

17. The method of claim 13, further comprising:
receiving, by the computing device, a request for retransmission of an I frame; and
retransmitting, by the computing device, the I frame based upon the request.

18. A method for real time video communication, comprising:
evaluating, by a computing device, dependency data incorporated into each frame of a plurality of frames to reassemble a dependency structure for the plurality of frames, wherein:
the plurality of frames is received from a sending component that transfers each of the plurality of frames,
the sending component is configured to assign sequence numbers for the plurality of frames and embed dependency data in the plurality of frames based upon the dependency structure in accordance with frame types and the sequence numbers,
each frame in the plurality of frames includes a unique sequence number for identifying a frame count of the frame,
the dependency structure specifies that a particular frame is dependent upon one or more previous frames for decoding, and
the dependency data for the particular frame includes a referral frame number for each previous frame upon which the particular frame is dependent;
tracking, by the computing device, frame loss by identifying lost frames based upon the sequence numbers for the plurality of frames; and
inhibiting, by the computing device, rendering of frames with artifacts based upon the dependency structure and frame loss, wherein the particular frame is concealed when the dependency data for the particular frame includes a referral number that corresponds to a lost frame.

19. The method of claim 18, further comprising:
measuring, by the computing device, video quality degrade due to frame loss caused by network packet loss or rate matching.

20. A computer-readable memory device storing computer-executable instructions that, when executed, cause a computing device to perform a method comprising:
evaluating dependency data incorporated into each frame of a plurality of frames to reassemble a dependency structure for the plurality of frames, wherein:
the plurality of frames is received from a sending component that transfers each of the plurality of frames,
the sending component is configured to assign sequence numbers for the plurality of frames and embed dependency data in the plurality of frames based upon the dependency structure in accordance with frame types and the sequence numbers,
each frame in the plurality of frames includes a unique sequence number for identifying a frame count of the frame, the dependency structure specifies that a particular frame is dependent upon one or more previous frames for decoding, and the dependency data for the particular frame includes a referral frame number of each previous frame upon which the particular frame is dependent;

tracking frame loss by identifying lost frames based upon the sequence numbers for the plurality of frames; and inhibiting rendering of frames with artifacts based upon the dependency structure and frame loss, wherein the particular frame is concealed when the dependency data for the particular frame includes a referral number that corresponds to a lost frame.

21. The computer-readable memory device of claim 20, wherein:

the particular frame comprises a plurality of packets, and each of the plurality of packets comprises a payload header that includes the sequence number of the particular frame and each referral frame number of each previous frame upon which the particular frame is dependent.

22. A computer-readable memory device storing computer-executable instructions that, when executed, cause a computing device to perform a method comprising:

identifying a plurality of frames to be encoded for transmission;

assigning sequence numbers for the plurality of frames, wherein each sequence number of each frame identifies a frame count of each frame in the plurality of frames;

embedding dependency data in the plurality of frames based upon a dependency structure for the plurality of frames in accordance with frame types and the sequence numbers, wherein:

the dependency structure specifies that a particular frame is dependent upon one or more previous frames for decoding, and the dependency data for the particular frame includes a referral frame number of each previous frame upon which the particular frame is dependent; and transmitting the plurality of frames to a receiving component that is configured to:

evaluate the dependency data incorporated into each frame of the plurality of frames to reassemble the dependency structure for the plurality of frames, track frame loss and identify lost frames based upon the sequence numbers for the plurality of frames; and inhibit rendering of frames with artifacts based upon the dependency structure and frame loss, wherein the particular frame is concealed when the dependency data for the particular frame includes a referral frame number that corresponds to a lost frame.

23. The computer-readable memory device of claim 22, wherein:

the particular frame comprises a plurality of packets, and each of the plurality of packets comprises a payload header that includes the sequence number of the particular frame and each referral frame number of each previous frame upon which the particular frame is dependent.

* * * * *